(12) United States Patent
Cardone et al.

(10) Patent No.: US 7,996,891 B2
(45) Date of Patent: Aug. 9, 2011

(54) SYSTEMS, METHODS AND COMPUTER PROGRAM PRODUCTS FOR GENERATING ANONYMOUS ASSERTIONS

(75) Inventors: Richard J. Cardone, Austin, TX (US); Michael A. Halcrow, Pflugerville, TX (US); Benjamin M. Landman, Cedar Park, TX (US); Kent E. Yoder, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 12/022,218

(22) Filed: Jan. 30, 2008

(65) Prior Publication Data

US 2009/0193509 A1    Jul. 30, 2009

(51) Int. Cl.
*G06F 7/04* (2006.01)
(52) U.S. Cl. .......... 726/10; 726/5; 726/18; 726/19; 713/151; 713/153
(58) Field of Classification Search .............. None
See application file for complete search history.

(56) References Cited

U.S. PATENT DOCUMENTS

| 7,181,017 | B1 | 2/2007 | Nagel et al. |
| 2003/0014631 | A1 | 1/2003 | Sprague |
| 2005/0283608 | A1* | 12/2005 | Halcrow et al. ............... 713/175 |

OTHER PUBLICATIONS

Carroll et al., "A Secure And Efficient Voter-Controlled Anonymous Election Scheme", Proceedings of the International Conference on Information Technology: Coding and Computing (ITCC'05).

* cited by examiner

*Primary Examiner* — Kaveh Abrishamkar
(74) *Attorney, Agent, or Firm* — Cantor Colburn LLP; Steven Bennett

(57) ABSTRACT

Systems, methods and computer program products for generating anonymous assertions. Exemplary embodiments include a method for generating anonymous assertions, the method comprising engaging anonymous role authentication via one or more authenticator services, generating an assertion token on a trusted assertion device that is booted into a trusted configuration, and processing the assertion and validating a right of the user to make the assertion for the event.

3 Claims, 3 Drawing Sheets

US 7,996,891 B2

SYSTEMS, METHODS AND COMPUTER PROGRAM PRODUCTS FOR GENERATING ANONYMOUS ASSERTIONS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to trusted computing, and particularly to systems, methods and computer program products for generating anonymous assertions.

2. Description of Background

Currently, anonymous role authentication can be implemented with an anonymous authentication controller that enables a user to control anonymity of the user's own identity for role based network accesses to resources. A role authentication certificate is received from a role authenticator by a user. In exemplary embodiments, the role authenticator issues the role authentication certificate to certify that the holder of the role authentication certificate is a member of a particular role without having the ability to track an identity of a user holding the role authentication certificate. Next, an anonymous channel is established for the user to anonymously present the role authentication certificate to a resource protector, wherein the resource protector requires the user to authenticate into the particular role to access a resource, wherein the role authentication certificate authenticates the user into the particular role without enabling the resource protector to ascertain the identity of the user, such that the user is in control of maintaining anonymity of the user identity for authenticated role-based accesses.

With Anonymous Role Authentication, a user can make some sort of an assertion on a computing device, and that assertion can be anonymously linked to a prior authentication. However, unless the computing device on which the assertion is made can be trusted, then the entity evaluating the assertion cannot be sure that the cryptographic operations were performed according to the intent of the user. For instance, the problems involving malware (such spyware and adware) on consumer operating systems are well known. Such malicious software can trivially compromise the integrity of the machine and intercept cryptographic keys or cause software to execute in a way that the user did not intend.

SUMMARY OF THE INVENTION

Exemplary embodiments include a method for generating anonymous assertions, the method including engaging anonymous role authentication via one or more authenticator services, including submitting an anonymous authorization token request and user credentials to the one or more authenticator services, authenticating a user via the user credentials, determining whether the user is authorized to make a particular assertion, based on an assertion type that applies to an event, determining whether the user has already authenticated with the one or more authenticator services for the event, completing a blind signature process supplying an anonymous authorization token to the user, the anonymous authorization token enabling the user to make the assertion in the event, generating an assertion token on a trusted assertion device that is booted into a trusted configuration, processing the assertion and validating a right of the user to make the assertion for the event, including verifying the attestation identity key signature, which is registered and trusted by the assertion evaluator, verifying the anonymous authorization token signature, in which a key for the anonymous authorization token signature is registered and trusted by the assertion evaluator, verifying the platform configuration registers and the log, which are device-specific and attest a state of the device at a time the assertion token is generated and interpreting the assertion descriptor and the assertion.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution, which provides systems and methods for including Trusted Computing technology in the Anonymous Role Authentication procedure in order to provide the evaluating entity with assurance about the integrity of the machine on which the application produced the data. As such a mechanism for machine registration and authentication that preserves user anonymity throughout the entire process is provided. The machine registration may be an optional component where strong assurance is required, such as in public elections. This general method has applications in fields such as electronic voting.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

In exemplary embodiments, the systems and methods described herein include a process and data format for producing anonymous Trusted Computing-based assertions. These assertions have a cryptographic assurance of having been generated on a trusted machine by an authorized, yet anonymous, user. This assurance preserves the anonymity of the user while simultaneously allowing an assertion evaluator to validate the integrity of the submitted assertion. Furthermore, the assertions themselves can be directly analyzed and verified by third parties while still preserving the anonymity of the users.

In exemplary embodiments, the systems and methods described herein are accomplished by leveraging Trusted Computing technology shipping in commodity mass-produced general-purpose computing devices, such as laptops, in order to temporarily transform the devices into trusted special-purpose assertion generation machines.

In exemplary embodiments, the systems and methods described herein use the specifications published by the Trusted Computing Group (TCG) to implement the machine integrity components, but this invention is not necessarily limited to using said specifications to accomplish the same. The TCG has the industry-recognized role of defining Trusted Computing standards.

In the context of the exemplary embodiments described herein, terms such as "AIK," "PCR," and "log" possess meanings that are defined in the TCG specification documents. Those ordinarily skilled in the art will understand that these terms refer to general enabling components of the system, and those components may take many potential forms. The AIK is an Attestation Identity Key, which a Trusted Platform Module uses to attest the state of the machine which it governs; however, any cryptographic key serving this same purpose will suffice. The state of the machine is represented by one or more Platform Configuration Registers (PCR) and the system log; however, any mechanism for representing machine state will suffice.

Figure 1:
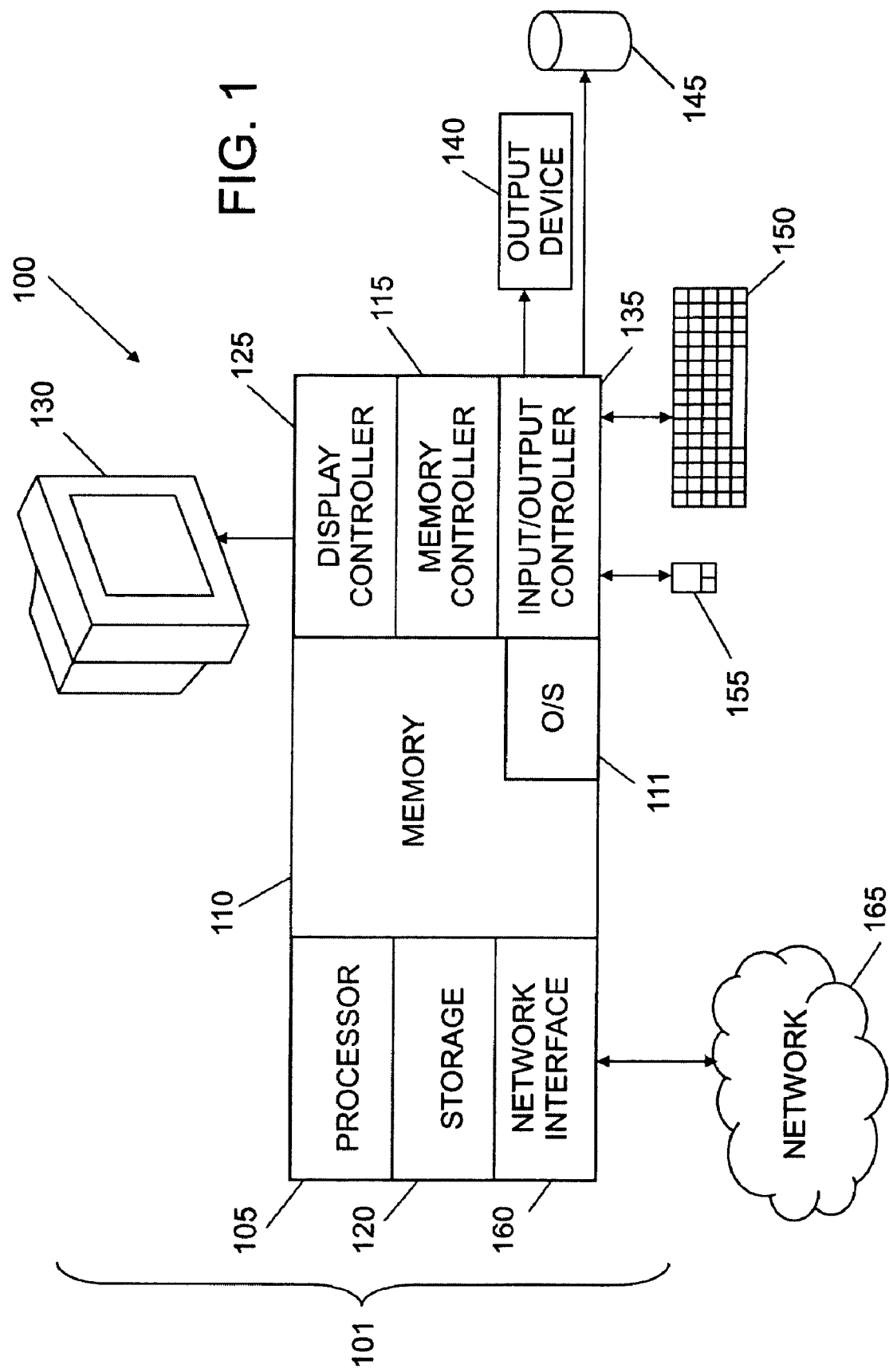
FIG. 1 illustrates a block diagram of a system for generating anonymous assertions.

FIG. 1 illustrates a block diagram of a system 100 for generating anonymous assertions. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the anonymous assertion generation methods described herein in accordance with exemplary embodiments and a suitable operating system (OS) 111. The operating system 111 essentially controls the execution of other computer programs, such as anonymous assertion generation systems and methods described herein, and provides scheduling, input-output control, file and data management, memory management, and communication control and related services.

The anonymous assertion generation methods described herein may be in the form of a source program, executable program (object code), script, functional programming languages such as Scheme and O'Caml or any other entity comprising a set of instructions to be performed. When a source program, then the program needs to be translated via a compiler, assembler, interpreter, or the like, which may or may not be included within the memory 110, so as to operate properly in connection with the O/S 111. Furthermore, the anonymous assertion generation methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a NIC or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The anonymous assertion generation methods described herein and the OS 111, in whole or in part, but typically the latter, are read by the processor 105, perhaps buffered within the processor 105, and then executed.

When the systems and methods described herein are implemented in software, as is shown in FIG. 1, it the methods can be stored on any computer-readable medium, such as storage 120, for use by or in connection with any computer related system or method. In the context of this document, a computer-readable medium is a n electronic, magnetic, optical, or other physical device or means that can contain or store a computer program for use by or in connection with a computer related system or method. The anonymous assertion generation methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via optical scanning of the paper or other medium, then compiled, interpreted or otherwise processed in a suitable manner if necessary, and then stored in a computer memory.

In exemplary embodiments, where the anonymous assertion generation methods are implemented in hardware, the anonymous assertion generation methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In exemplary embodiments, a USER is a single intentional agent who wishes to make an assertion in an EVENT. For instance, a USER could be an employee or a voter. In exemplary embodiments, an EVENT involves an object about which USERS make assertions. For instance, an EVENT could be leaving feedback about a manager or casting a ballot in a public election.

Figure 2:
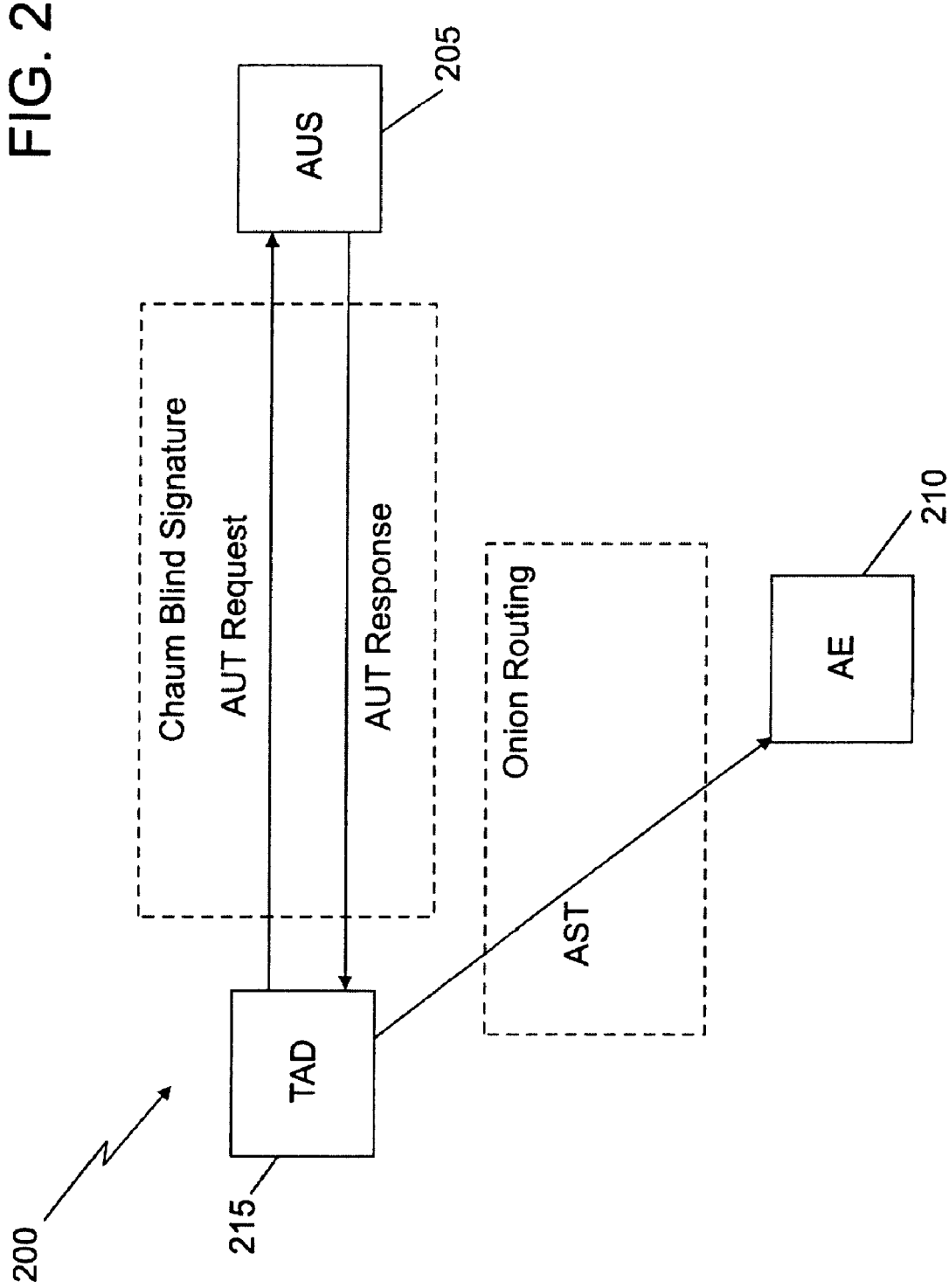
FIG. 2 illustrates a block diagram of an exemplary anonymous assertion generation flow in accordance with exemplary embodiments.
Figure 3:
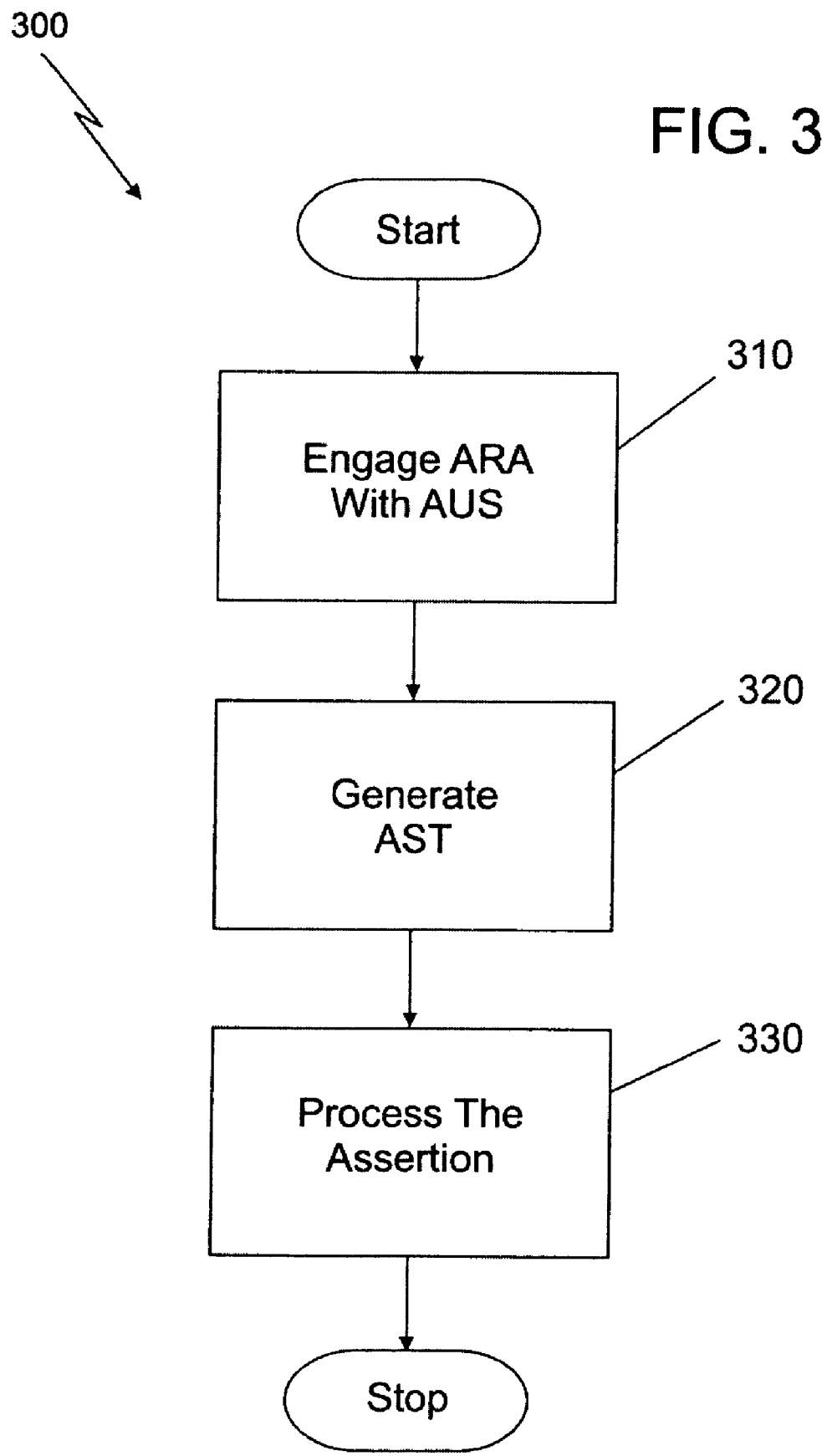
FIG. 3 illustrates a flow chart for a method for anonymous assertion generation in accordance with exemplary embodiments.

FIG. 2 illustrates a block diagram of an exemplary anonymous assertion generation flow 200 in accordance with exemplary embodiments. FIG. 3 illustrates a flow chart for a method 300 for anonymous assertion generation in accordance with exemplary embodiments.

In exemplary embodiments, at block 310, the USER uses a machine under his physical control and jurisdiction to engage in Anonymous Role Authentication (ARA) with one or more Authenticator Services (AUS) 205. In exemplary embodiments, the USER further submits an anonymous Authorization Token (AUT) request to the AUS, along with his credentials. In exemplary embodiments, any commonly-used authentication mechanism can be implemented in order for the user to supply credentials to the AUS. For example, citizens may authenticate on government web sites by providing a secret pin that the agency sends the citizen in the postal mail. In addition, the government can issue X.509 certificates to citizens for use with voter registration sites. Authentication protocols are myriad and dependent on the infrastructure in which the authentication takes place (Kerberos, SSL/TLS, etc.). In addition, the AUS 205 authenticates the USER via his identifying credentials. In exemplary embodiments, the AUS 205 further determines whether the USER is authorized to make the assertion in question, based on the assertion type that applies to a specific EVENT. The AUS 205 then determines whether the USER has already authenticated with the AUS for the given EVENT. The AUS, upon authorizing the USER to make an assertion in the given EVENT, completes a blind signature process. In exemplary embodiments, the blind signature process includes a Chaum blind signature scheme. In particular, a zero-knowledge protocol employing a cut and choose technique is preferably employed. First, the USER presents a set of blinded certificates to the Authenticator Services to sign. Then, using the cut and choose technique, the Authenticator Services randomly chooses a subset of the certificates and requests the blinding factors for that subset from the USER. The USER sends the requested blinding factors for the subset of certificates to the Authenticator Services. The Authenticator Services unblinds the subset of certificates and verifies the integrity of the contents identifying the role. More specifically, the Authenticator Services determines whether all the unblinded certificates specify that the USER is a member of the role. If any one of the unblinded certificates does not specify the same role membership as any of the other unblinded certificates, then the USER is attempting a fraud. After a successful blind signature exchange, the USER is then left with an anonymous AUT that allows him to make an assertion in the given EVENT. As further described herein an Assertion Evaluator validates that the AUTs are not double-spent.

At block 320, the user generates an Assertion Token (AST) on a Trusted Assertion Device (TAD) 215 booted into a trusted configuration. In exemplary embodiments, the AST may be the transmitted from any location, and an Onion Routing method prevents an Assertion Evaluator (AE) 210 from tracing the location and possibly identifying the USER.

In exemplary embodiments, an Onion Routing channel may be implemented as an anonymizing channel. An Onion Routing channel typically can include a chain of multiple nodes that pass encrypted packets from one to another. In exemplary embodiments, the nodes are network nodes. They may be hosts on the Internet with their own IP addresses, for instance. The encrypted packets are enveloped such that each node in the chain only knows the immediately preceding and immediately following node in the encrypted packet's path. Sufficient nodes are included in the chain so that the address of the originating node is protected, protecting the resource protector from determining the identity of the user from the network location at which the user is located. In exemplary embodiments, the AST includes an AUT, an Assertion Descriptor (AD), a PCR (platform configuration register)/Log and an Attestation Identity Key (AIK) signature. In exemplary embodiments, the AST is implemented to register a single valid assertion in the given EVENT. In exemplary embodiments, the TAD and the AUS may or may not attest their state to one another, depending on the security assurance requirements of the application for which the anonymous trusted assertion is being applied. Neither may attest, only the TAD may attest, only the AUS may attest, or both may attest to one another.

As discussed above, blind signatures can be effectuated through any number of functionally equivalent cryptographic operations. In exemplary embodiments, the systems and methods described herein can implement a Chaum blind signature.

At block 330, the AE 210 processes the assertion, validating the right of the submitting USER to make the assertion for the EVENT while preserving the USER's anonymity, via the following procedure: 1) Verify the AIK signature (the AIK must be registered and trusted by the AE 210); 2) Verify the AUT signature (the key used for the AUT signature must be registered and trusted by the AE 210); 3) Verify the PCR values and the log (the PCR values and log are device-specific and attest to the state of the voting machine at the time that the AST is generated); and 4) Interpret the AD and process the assertion accordingly. In exemplary embodiments, the AD is entirely application-specific. If it's an electronic vote, for instance, it may include a precinct and ballot schema.

In exemplary embodiments, In order to preserve user anonymity, the machine's AIK, along with its trusted PCR and log states must be registered in an anonymous fashion. That is, the AE must be able to verify the machine's integrity without linking the machine with the user.

Furthermore, all of the AST's, along with the public components of the AUT signature keys and the table of public components of the AIK's, can be disclosed openly to the public. The users themselves can use an Onion Routing channel to submit their AST's to whomever they please. Members of the public can evaluate the AST's and determine independently whether their evaluations correlate with an official result. In that way, fraud can be detected, all without compromising the anonymity of the individual users, the integrity of the machines themselves, or the integrity of the assertions, either individually or in aggregate. It is therefore appreciated that the systems and methods described herein have immediate applications in such fields as electronic voting or providing feedback about a manager in a company survey.

In exemplary embodiments, block 310 can be performed on a machine that itself is booted into a trusted state, which can be accomplished, for instance, with a trusted bootable CD appliance that has the sole function on negotiating for an AUT. Block 320 can be performed on an entirely separate machine. Block 330 can be performed by any member of the general public.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for generating anonymous assertions, the method comprising:

engaging anonymous role authentication via one or more authenticator services, including:

submitting an anonymous authorization token request and user credentials to the one or more authenticator services;

authenticating a user via the user credentials;

determining whether the user is authorized to make an assertion of the anonymous assertions, based on an assertion type that applies to an event;

determining whether the user has already authenticated with the one or more authenticator services for the event;

in response to authorizing the user to make the assertion in the event, completing a blind signature process;

supplying an anonymous authorization token to the user, the anonymous authorization token enabling the user to make the assertion in the event;

generating an assertion token on a trusted assertion device that is booted into a trusted configuration, wherein the assertion token is transmitted from any one of a plurality of locations and is transmitted via an Onion Routing method thereby preventing an assertion evaluator from tracing a location of the assertion token and an identity of the user, wherein the assertion token includes the anonymous authorization token coupled to an assertion descriptor, a platform configuration register and log, and an attestation identity key signature;

determining attestations between the trusted assertion device and the authenticator services, depending on predetermined security assurance requirements, the attestations including at least one of: neither the trusted assertion device nor the authenticator services attesting, only the trusted assertion device attesting, only the authenticator services attesting and both the trusted assertion device and the authenticator services attesting;

processing the assertion and validating a right of the user to make the assertion for the event, including:

verifying the attestation identity key signature, which is registered and trusted by the assertion evaluator;

verifying the anonymous authorization token signature, in which a key for the anonymous authorization token signature is registered and trusted by the assertion evaluator;

verifying the platform configuration registers and the log, which are device-specific and attest a state of the device at a time the assertion token is generated; and interpreting the assertion descriptor and the assertion.

2. The method as claimed in claim 1 wherein verifying the platform configuration registers and the log is performed by the trusted assertion device.

3. The method as claimed in claim 2 further comprising taking action in accordance with the interpreted assertion.

* * * * *